United States Patent [19]
Freeman

[11] 3,768,851
[45] Oct. 30, 1973

[54] DEBRIS COLLECTION DEVICE

[76] Inventor: Ralph Capron Freeman, 125 N. Galveston St., Arlington, Va. 22203

[22] Filed: Sept. 16, 1971

[21] Appl. No.: 181,059

[52] U.S. Cl. .................. 294/55, 15/257.4, 294/1 R
[51] Int. Cl. ............................................. A47f 13/06
[58] Field of Search .............. 294/19 R, 19 A, 50.6, 294/51, 55, 49; 15/257.1, 257.4, 257.5, 257.6, 257.7

[56] References Cited
UNITED STATES PATENTS

| | | | |
|---|---|---|---|
| 2,176,135 | 10/1939 | Horst | 15/257.4 |
| 112,102 | 2/1871 | Whittemore | 15/257.7 |
| 1,013,195 | 1/1912 | McConnaughy | 15/257.6 X |
| 2,399,850 | 5/1946 | Benskin | 15/257.4 |
| 2,666,662 | 1/1954 | McLeod | 294/55 |

*Primary Examiner*—Richard E. Aegerter
*Assistant Examiner*—Johnny D. Cherry
*Attorney*—James E. Armstrong et al.

[57] ABSTRACT

A device for removing debris from sidewalks, roads, curbs, grass, rugs, floors and other areas including a container portion with an opening, a lip portion, a door or cover in the form of a kickplate with appendages, and a handle means.

3 Claims, 7 Drawing Figures

Patented Oct. 30, 1973  3,768,851

INVENTOR

BY

ATTORNEY

DEBRIS COLLECTION DEVICE

BACKGROUND OF THE INVENTION

The present invention relates to an improved device for removing debris from sidwalks, roads, curbs, grass, rugs, floors and other similar type areas. Particularly, the present invention contemplates a device for removing dog excrement from the ab-mentioned areas.

In the past, debris in the form of dog excrement has not been removed at all from outdoor areas such as sidewalks, roads, curbs or grass and has been collected and removed from indoor areas such as rugs, floors, and hallways only in cumbersome and unpleasant ways such as by the use of cardboard, paper or similar material.

Leaving dog excrement on the outside has resulted in umpleasant and unsightly appearances and odors and a danger to those who may accidentally come into contact with it and especially to small children who come into contact with it. Dog excrement inside is of course umpleasant, unsightly and unhealthy.

The great increase in the number of dogs owned has produced a very grave, but generally unnoticed danger, in that the ever increasing amount of dog excrement present, especially in outdoor areas has created a definite health hazard in that this waste is a carrier and breeder of germs and continues to be so while it remains unremoved and decays. Further, the increased presence of the waste advances the opportunity for acciental contact by humans who are thus exposed to great inconvenience and unpleasantness.

A primary object, therefor, of the present invention is to provide a device which is an ecological aid in the removal of waste or deris in the form of dog excrement from outdoor areas such as sidewalks, curbs, roads and grass.

Another object of the present invention is to provide a device for the purpose of convenient and simple removal of waste in the form of dog excrement from indoor areas such as rugs, floors and hallways.

Another objection of the present invention is to provide a device for the above purpose, which is simple, swift and convenient to use and which is compact, lightweight and non-complex in structure so that it can be easily and economically mass-produced.

Thus, this invention offers a solution to a variety of problems and disadvantages related to the existence of dog excrement both indoors and outdoors, and especially to those who own dogs.

SUMMARY OF THE INVENTION

In general summary, the device which is the subject matter of this invention includes a main container portion with sides, back, bottom, top and an opening. Extending upwardly from the top is a means for holding, directing and carrying the device. A lip in the form of an extension of the bottom is formed along the length of the opening. Movably affixed to the other lenght of the opening is a door or cover for the opening in the form of a kickplate which has extensions in the form of appendages projecting longitudinally beyond the opening.

DETAILED DESCRIPTION OF THE DRAWING

Figure 1:
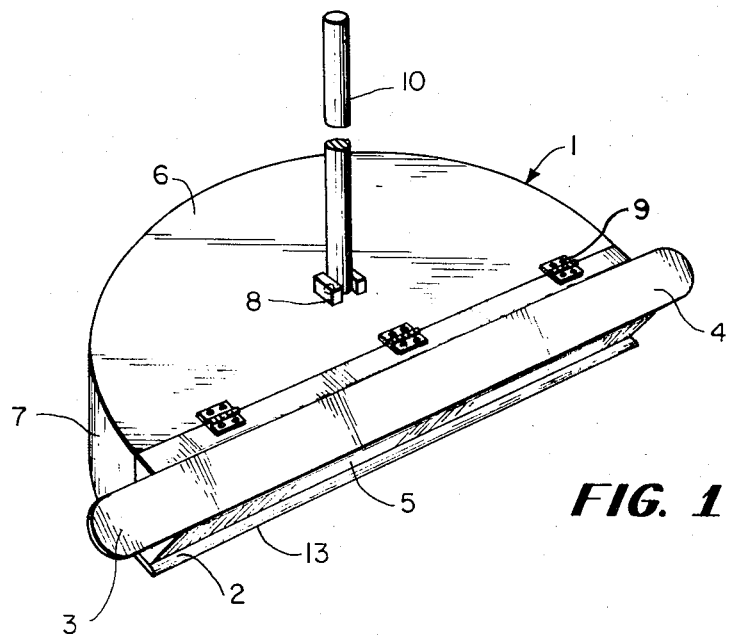
FIG. 1 is a perspective view of the device.
Figure 2:
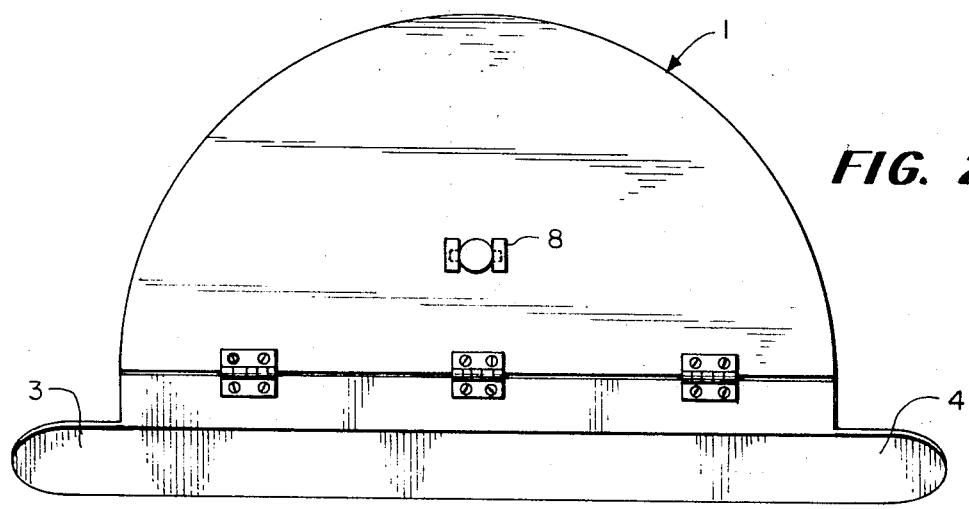
FIG. 2 is a plan view of the device.
Figure 3:
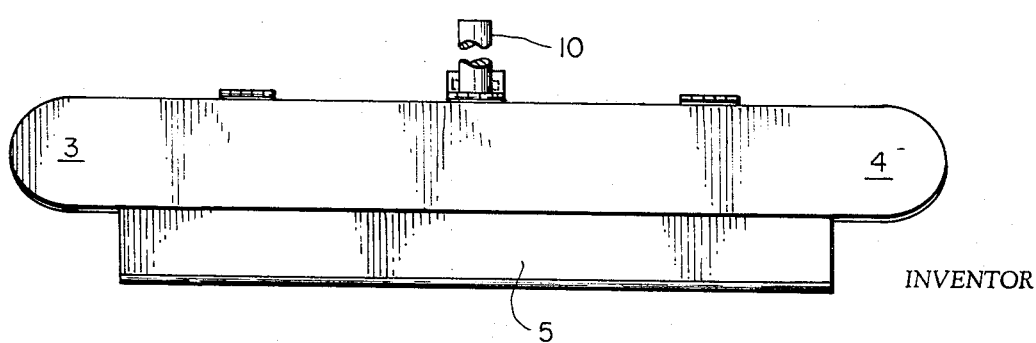
FIG. 3 is a front elevation view of the device.

Referring now of FIG. 1, there is shown a completed debris collection device comprised of a container portion 1 which is hollow and may be any shape desired, but is preferably, and most advantageously as shown in the shape of a half section of a cylinder. The container consists of a top 6, a bottom (not shown) which is parallel to the top and separated therefrom by a continuous curved side 7. A cover or kickplate 5 is rotably attached to the top 6 of container 1 by one or more means 9 which may be a hinge, and said cover is normally held closed with reference to the container opening 11 by means of its own weight and orientation. Preferably, the kickplate is weighted by increasing the mass of material forming it, or attaching weights in order to give it more force in closing and holding it closed. Forming extensions longitudinally on either end of the kickplate 5 and extending longitudinally on either end of the kickplate 5 and extending longitudinally beyond the opposite boundaries of the opening 11 are ears 3, 4. Projecting from opening 11 is a lip 2 which is an extension of the bottom of the container 1 and preferably has a beveled forward edge 13. When the kickplate 5 is closed in relation to the opening 11, the lip projects beyond the kickplate 5 as can also be seen in FIG. 5. In closing and when in a closed position, the kickplate 5 fits nearly flush with the lip 2.

Affixed to the top of the container 1 nearer the opening 11 than the back of the container 1 is a means 8 for movably attaching the handle 10 to the top of the container 1. Any means is suitable for the attachment. However, a snap or pop hinge arrangement is most simple.

Figures 4, 5:
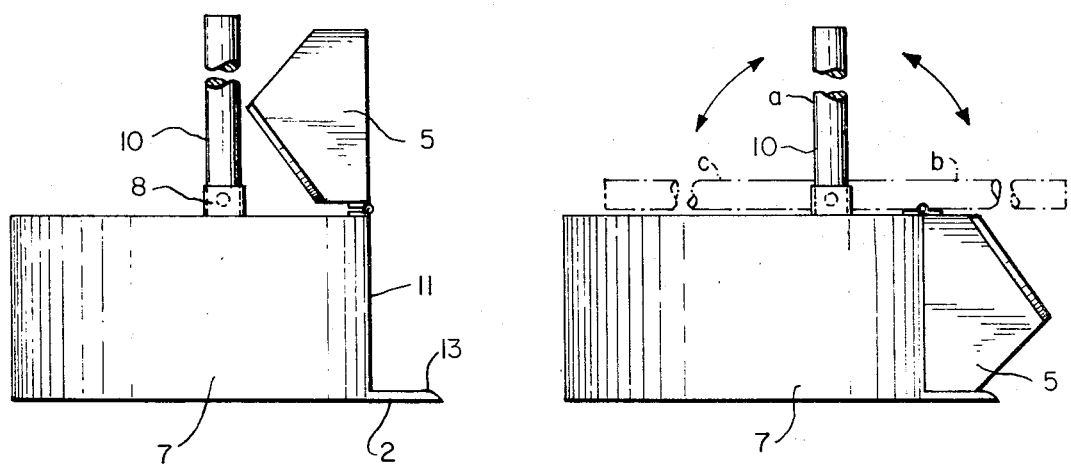
FIG. 4 is a side elevation view of the device with the kickplate raised and the opening exposed.
FIG. 5 is another side elevation view of the device, but having the kickplate lowered, the opening closed and showing the three handle positions.

In operation the device is held with the handle 10 in approximately position "a" as shown in FIG, 5 and placed upon the surface whereon the debris rests; then, while the device is held firmly in position by pressing down on the handle, the toe of the shoe is pressed against the back of either ear 3 or 4 and pushed forward and upward to raise the kickplate 5, by circular motion, to the open position shown in FIG. 4; then the device is positioned so that the debris such as dog excrement rests partially on the beveled edge 13 of the lip 2. Next, the kickplate is pushed forward and downward by the operator's foot. The weighted kickplate strickes the debris and forces it over the lip, through the opening and into the container, with the kickplate then remaining flush in closed relation against the periphery of opening 11, and seated nearly flush against the lip 2. The container is then lifted by pulling up on handle 10 which will cause the handle to advance to position "b" as shown in FIG. 5 due to the off-center location of the handle attaching means, so that the opening 11 is parallel to the ground. In this way, the device can be conveniently carried until needed again and also the debris will be forced by gravity to the back of the container portion 1 away from the opening 11.

when not in use, the handle 10 may be located in position "c" as shown in FIG. 5 for convenient and compact storage.

Figure 6:
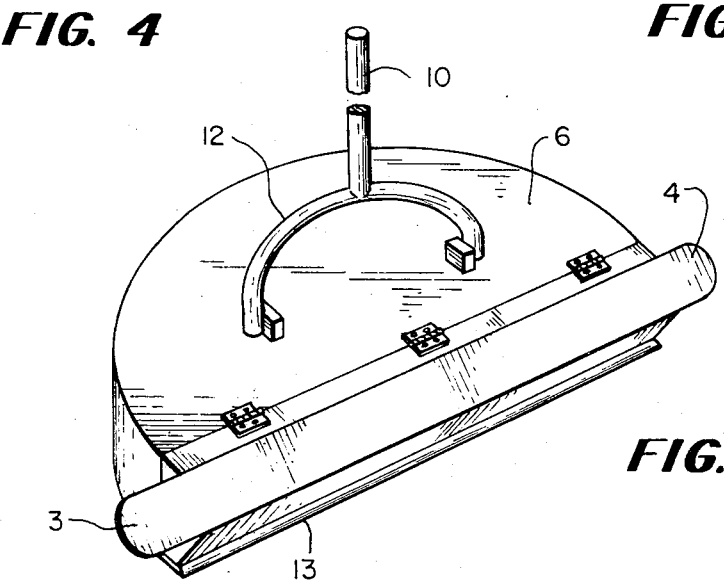
FIG. 6 is a perspective view showing an alternate handle construction.

While the device may be constructed of any material, it is preferably contemplated that plastic be used and that preferably, an injection molding process be employed. Plastic is quite economical and also has the advantage of being lightweight. The injection molding process lends itself to mass-production, and the device could be formed from only three separate parts; i.e., the handle, the kickplate, and the container, thus assembly would be simple and convenient. Extra quantity could be used for kickplate to give it the desired weight, or additional mass could be added separately such as by attaching weights, to produce the desired result. In any event, the additional weight concentration is preferably placed along the lower longitudinal periphery placed along the kickplate opposite the line of junction with the top. An alternative handle arrangement is shown in FIG. 6 whereby a half hoop or loop 12 in the form of a semi-circle is movably fixed at is two ends to the top 6 of the container 1 and the handle is rigidly attached to the half hoop or loop at its midpoint.

Figure 7:
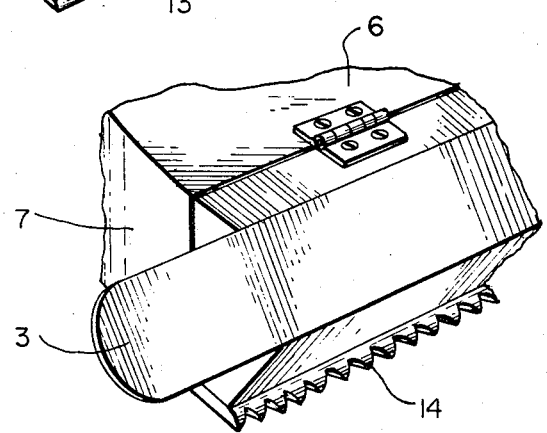
FIG. 7 is a partial perspective view showing an alternate lip construction.

An alternate lip structure is shown in FIG. 7 with teeth 14 designed to facilitate removing debris in areas of less sturdy ground, such as grass.

As hereinbefore presented, the operation of the device is simple, expedient and convenient. Moreover, the rounded back shape permits easy emptying and cleaning such as by mere washing with water to flush out the debris. Further, being made of plastic with the simple structure and design contemplated, the device lends itself to economical mass production.

The device may be of any convenient size, but dimensions which have been found advantageous and satisfactory include a handle of approximately 36 inches in length which may also be telescoping in structure, in an opening 10 inches long and 2.5 inches high with an overall distance from opening to the farthest point back of approximately 5 inches, with ears 1.5 inches in extension.

Other variations of the foregoing embodiments of the invention will be apparent to those skilled in the art.

What is claimed is:

1. A device for the collection of debris and particularly dog waste, comprising a main container portion with sides, back, top, bottom, and opening, a pivotally mounted cover for said opening, a carrying handle extending from the top and pivotally secured thereto a lip with a beveled edge formed as an extension of the bottom and projecting from the lower pheriphery of the opening, a weighted kickplate mounted on said cover and extending beyond the ends thereof.

2. A device according to claim 1, wherein the side and back consist of a single continuous curve which separates the top and bottom which are parallel and unites them in the form of a half section of a cylinder.

3. A device according to claim 2, wherein the lip is serated and the handle is connected to the top by a loop which is seamed to the top at two points.

* * * * *